US011962360B2

(12) United States Patent
Chen et al.

(10) Patent No.: US 11,962,360 B2
(45) Date of Patent: *Apr. 16, 2024

(54) SYSTEMS AND METHODS FOR PREMISES MONITORING

(71) Applicant: Comcast Cable Communications, LLC, Philadelphia, PA (US)

(72) Inventors: Tianwen Chen, McLean, VA (US); Hongcheng Wang, Arlington, VA (US)

(73) Assignee: COMCAST CABLE COMMUNICATIONS, LLC, Philadelphia, PA (US)

( * ) Notice: Subject to any disclaimer, the term of this patent is extended or adjusted under 35 U.S.C. 154(b) by 243 days.

This patent is subject to a terminal disclaimer.

(21) Appl. No.: 17/501,730

(22) Filed: Oct. 14, 2021

(65) Prior Publication Data

US 2022/0239393 A1 Jul. 28, 2022

Related U.S. Application Data

(63) Continuation of application No. 16/820,708, filed on Mar. 17, 2020, now Pat. No. 11,184,092.

(51) Int. Cl.
*H04B 17/318* (2015.01)
*G01S 11/06* (2006.01)
(Continued)

(52) U.S. Cl.
CPC .......... *H04B 17/318* (2015.01); *G01S 11/06* (2013.01); *G08B 21/18* (2013.01); *H04B 17/336* (2015.01); *H04L 63/1416* (2013.01); *H04L 63/1425* (2013.01); *H04W 24/10* (2013.01); *H04W 64/006* (2013.01)

(58) Field of Classification Search
CPC .. H04B 17/318; H04B 17/336; H04B 17/345; G01S 11/06; G08B 21/18; G08B 21/0423; G08B 21/0469; G08B 13/187; H04L 63/1416; H04L 63/1425; H04L 67/12;
(Continued)

(56) References Cited

U.S. PATENT DOCUMENTS 8,253,563 B2 * 8/2012 Burnard ............. G08B 13/1681
340/541
8,917,186 B1 * 12/2014 Grant ................... G08B 29/126
340/3.3
(Continued)

OTHER PUBLICATIONS

Kosba, A. Saeed and M. Youssef, "Rasid: A robust WLAN device-free passive motion detection system," 2012 IEEE International Conference on Pervasive Computing and Communications, Lugano, 2012, pp. 180-189.
(Continued)

*Primary Examiner* — Ankur Jain
(74) *Attorney, Agent, or Firm* — BakerHostetler

(57) ABSTRACT

Monitoring a premises may comprise receiving signals from a plurality of devices. One or more spatially static devices of the plurality of devices may be determined based on strengths of the received signals. A user activity pattern may be determined based on changes in strengths of signals received from the spatially static devices. Abnormal user activity may be determined based on the user activity pattern and a strength of at least one signal received from at least one of the spatially static devices.

20 Claims, 9 Drawing Sheets

(51) Int. Cl.
*G08B 21/18* (2006.01)
*H04B 17/336* (2015.01)
*H04L 9/40* (2022.01)
*H04W 24/10* (2009.01)
*H04W 64/00* (2009.01)

(58) Field of Classification Search
CPC ..... H04W 24/10; H04W 64/006; H04W 4/33; H04W 4/38; H04W 24/08
See application file for complete search history.

(56) References Cited

U.S. PATENT DOCUMENTS

| | | | | |
|---|---|---|---|---|
| 9,202,363 | B1* | 12/2015 | Grant | G08B 29/126 |
| 9,812,001 | B1* | 11/2017 | Grant | G08B 29/20 |
| 2019/0371139 | A1* | 12/2019 | Engler | G06F 21/554 |
| 2020/0175831 | A1* | 6/2020 | Garg | H04B 17/318 |

OTHER PUBLICATIONS

Shukri S., Munirah Kamarudin L., Ndzi D., Zakaria A., Azemi S., Kamarudin K. and Syed Zakaria S. (2017). RSSI-based Device Free Localization for Elderly Care Application.In Proceedings of the 2nd International Conference on Internet of Things, Big Data and Security—vol. 1: IoTBDS, ISBN 978-989-758-245-5, pp. 125-135.
US Patent Application filed on Mar. 17, 2020, entitled "Systems and Methods for Premises Monitoring", U.S. Appl. No. 16/820,708.
Wilson and N. Patwari, "Radio Tomographic Imaging with Wireless Networks," in IEEE Transactions on Mobile Computing, vol. 9, No. 5, pp. 621-632, May 2010.

* cited by examiner

Determine a group of devices of a plurality of spatially static devices in an area of a premises
810

Determine a pattern associated with user activity in the area
820

Determine abnormal user activity in the area of the premises based on the pattern and the RSSI of a signal received from a device in the group
830

FIG. 8

SYSTEMS AND METHODS FOR PREMISES MONITORING

CROSS REFERENCE TO RELATED APPLICATIONS

This application is a continuation of U.S. patent application Ser. No. 16/820,708, filed Mar. 17, 2020, now U.S. Pat. No. 11,184,092, issued Nov. 23, 2021, which is hereby incorporated by reference in its entirety.

BACKGROUND

Presence detection or in-home behavior monitoring systems may be used to detect an intruder or identify normal and abnormal user behavior in a home. Existing presence detection or in-home behavior monitoring systems suffer from several drawbacks. For example, the systems often intrude on user privacy. As another example, the systems may cause user inconvenience by requiring a user to routinely and actively engage with components of the system. Improvements in presence detection or in-home behavior monitoring systems are needed.

SUMMARY

Devices, such as user devices, entertainment devices, and/or home automation devices (for example, Internet of Things (IOT) devices), may be located at a premises. Based on strengths of signals output by the devices over time, such as based on signal strength fluctuations, it may be determined that one or more of the devices comprise a spatially static device. The spatially static device may comprise a device that is not frequently moved by users.

The strength of signals output by the spatially static device may be affected by the presence and/or movement of a user, and such effect on the output signals can be measured by receiving devices. For example, the body of the user may absorb and/or interfere with the signals. Therefore, a user activity pattern may be determined based on strengths of the signals over time (e.g., times of day), such as based on signal strength fluctuations over time. Patterns of the strengths of the signals may be determined. The patterns of signal strength may be associated with normal user behavior, such as associated with absorption of interference of the signals occurring when a user follows a normal daily routine. Patterns of strengths of received signals may be compared to the patterns determined to be associated with normal user behavior in order to determine that captured signals represent normal or abnormal behavior.

BRIEF DESCRIPTION OF THE DRAWINGS

The following drawings show generally, by way of example, but not by way of limitation, various examples discussed in the present disclosure. In the drawings:

FIG. 8 shows an example method.

DETAILED DESCRIPTION

Figure 1:
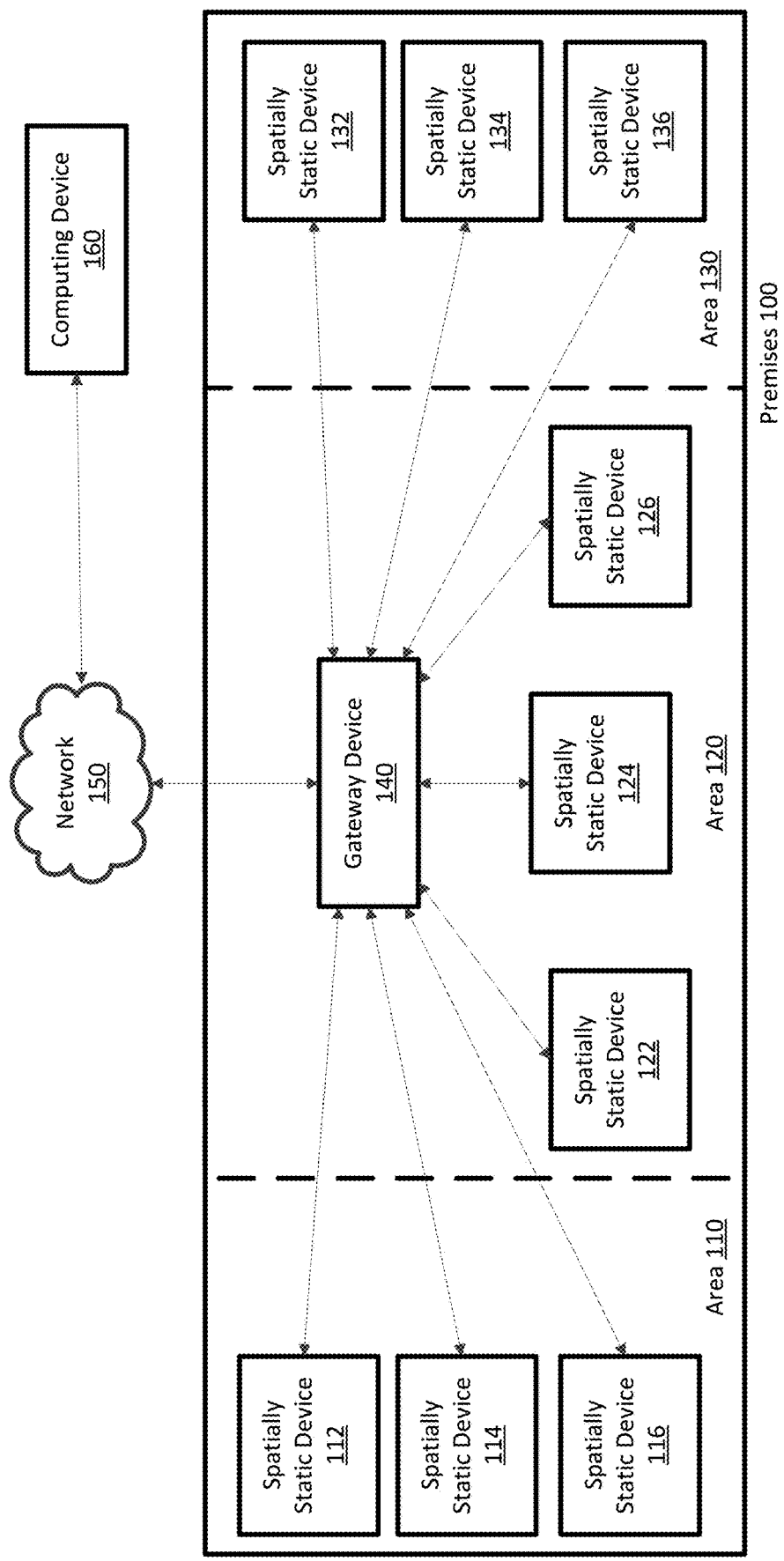
FIG. 1 shows an example operating environment.

One or more spatially static devices may be located at a premises. The spatially static devices may comprise user devices, such as desktop computers or televisions, as examples. The spatially static devices may comprise Internet of Things (IoT) devices. The spatially static devices may comprise premises management devices. The premises management devices may comprise security system devices, such as sensors, alarms, cameras, and/or control panels. The premises management devices may comprise home automation devices, lighting devices, thermostats, garage door openers, locks, digital assistants, and/or smart appliances. The spatially static devices may comprise entertainment devices, such as set-top boxes, audio devices, gaming systems, and/or media players.

Spatially static devices may comprise devices that are not frequently moved by users; their position in a space may be stationary, and they may remain substantially static over time. For example, a spatially static device may comprise a device that is not portable, such as a large device and/or a heavy device. For example, a user may not move a large television or a large speaker on a daily or weekly basis. The spatially static device may comprise a device that is fixed, secured, and/or installed at a premise. For example, a user may not move premises management system devices, such as a thermostat device, a motion sensor, an alarm, and/or a lighting device mounted on a wall of a house. The spatially static device may comprise a device that is configured to be connected to one or more peripheries or external devices, such as an external power source or an output device. Cords and other peripheries connected to the device may make it inconvenient for a user to move the device. For example, a home computer that is connected to a monitor, a keyboard, a mouse, and/or a power source may not be moved by a user on a daily or weekly basis. The spatially static device may comprise a device that is not frequently moved by a user during normal use of the device, such as a lighting device and/or a premises management device (e.g., a home automation device and/or a security system device).

A gateway device may be located at the premises and may configured to communicate with the spatially static devices. Signals received by the gateway device from the spatially static devices may have associated received signal strength indicators (RSSIs). The RSSI may comprise a measurement of the power level of the signal. The RSSI associated with a signal received from a spatially static device may be determined by the gateway device.

Movement and/or presence of user at the premises may cause absorption and/or interference of the signals from the spatially static devices. The absorption and/or interference of the signals may affect the RSSIs of the signals, such as by causing the RSSIs to fluctuate. For example, the RSSI associated with a signal from a spatially static device may be weaker as a result of a user being near the spatially static device compared to an RSSI associated with a signal when no one is around the spatially static device. Machine learning models may be used to understand how the spatially static devices are arranged in a premises without a user's input regarding such arrangement of spatially static devices at a premises. The machine learning models may use RSSI data associated with the spatially static devices and/or patterns of the RSSI values.

RSSIs of signals output by the spatially static devices may be used to determine the spatially static devices. For example, the spatially static devices may be identified from a group of devices that may include non-spatially static devices, such as wearable devices and/or mobile devices, as examples. Since spatially static devices are not constantly moved, RSSI values associated with signals received from the spatially static devices may comprise distinct features compared to RSSI values of non-spatially static devices. For example, an RSSI associated with a signal from a spatially static device may exhibit fewer fluctuations than an RSSI associated with a signal received from a non-spatially static device.

RSSIs of signals output by the spatially static devices may be used to determine clusters of spatially static devices. The clusters of devices may comprise groups of devices that are spatially-related, such as within a particular room of area. RSSIs associated with signals output by a cluster of spatially static devices may exhibit disruptions at the same time or at similar times. Based on the RSSIs exhibiting disruptions, the group of spatially static devices may be determined to be in a same area and clustered together. For example, an RSSI associated with signals output by a home assistant device in a kitchen and an RSSI associated with signals output by a smart refrigerator in the kitchen may experience a disruption caused by a user walking through the kitchen. The home assistant device and the smart refrigerator may be determined to comprise a cluster, such as a cluster associated with the kitchen.

RSSIs patterns associated with normal user behavior may be determined. The patterns may be determined based on RSSI fluctuations across clustered areas. As an example, a user may arrive at a premises most weekdays at 5:00 p.m. The user may enter the premises through the kitchen and generally spend about five minutes in the kitchen making a snack. The user may next enter the living room. As the user moves through the kitchen and living room, that movement may cause fluctuations in the RSSI of signals received from the spatially static devices in those locations. An RSSI pattern associated with normal behavior for the user may be determined based on the determined fluctuations in the RSSIs of received signals.

Based on the RSSI pattern, a normal behavior profile for the user may be generated. The normal behavior profile for the user may indicate that the user is expected to arrive at an area associated with the kitchen at or around 5:00 p.m. on weekdays. The normal behavior profile for the user may indicate that the user is expected to stay in the area associated with the kitchen for about five minutes. The normal behavior profile for the user may indicate that the user is expected to arrive at an area associated with the living room after leaving the kitchen. The normal behavior profile may be determined by the gateway device and/or a computing device located external to the premises. The gateway device may send an indication of the normal behavior profile and/or the RSSI pattern associated with normal behavior of the user to a computing device located external to the premises.

An intruder to the premises may break into the premises at 2:00 p.m. on a weekday. The intruder may enter the premises via a window in a living room. The intruder's movement and/or presence in the living room may cause RSSIs associated with signals output by spatially static devices in the living room to fluctuate. An RSSI pattern may indicate normal RSSI of signals of the living room devices at 2:00 p.m. on a weekday. The RSSI values when the intruder enters the living room may at 2:00 p.m. may differ from the RSSI values of the pattern associated with normal behavior of a user of the premises. Based on the difference between the RSSI values of the signals received and the RSSI values indicated by the pattern, abnormal user behavior may be determined. The abnormal user behavior may be determined by the gateway device and/or a computing device located external to the premises. The gateway device may send an indication of the abnormal user behavior to a computing device located external to the premises.

Based on determining abnormal user behavior, an alert may be generated. The alert may be sent to a device associated with the premises. The alert may be sent to a device associated with a user associated with the premises. The alert may be sent to one or more emergency contacts, such as a 911 dispatch, a hospital, a police office, and/or a fire station. The gateway device may generate the alert or cause the alert to be generated. The gateway device may send the alert to a computing device located external to the premises.

Determining abnormal user behavior may aid in care for the elderly. Elderly users may tend to have regular routines. Based on determining abnormal user behavior in an elderly user, an alarm or alert may be generated and sent to one or more relatives of the elderly user, an elderly care center management, a medical services provider, and/or an emergency services provider, as examples.

FIG. 1 shows an example operating environment. The operating environment may comprise a premises 100. The premises 100 may comprise a residential structure or unit, such as a house or an apartment unit. The premises 100 may comprise a commercial structure or unit, such as a retail store. The premises 100 may comprise any premises wherein activity of users may form a behavioral pattern and wherein monitoring of user behavior is desired. The premises 100 may comprise one or more areas, such as a first area 110, a second area 120, and a third area 130.

A gateway device 140 may be located at the premises 100. The gateway device 140 may comprise a home automation device. The gateway device 140 may be configured to control and communicate with a plurality of devices, such as devices located at a premises and devices external to the premises. One or more spatially static devices may be located at the premises 100. The spatially static devices may comprise a first spatially static device 112, a second spatially static device 114, a third spatially static device 116, a fourth spatially static device 122, a fifth spatially static device 124, a sixth spatially static device 126, a seventh spatially static device 132, an eighth spatially static device 134, and a ninth spatially static device 136. The spatially static devices may be configured to communicate with the gateway device 140. For example, the spatially static devices may be configured to communicate with the gateway device 140 via Wi-Fi communication. A Wi-Fi signal or other communication signal output by one or more of the spatially static devices may have a received signal strength indicator (RSSI).

One or more of the spatially static devices may be located in an area of the premises 100. For example, the first spatially static device 112, the second spatially static device 114, and the third spatially static device 116 may be located at a first area 110 of the premises 100. The first area 110 may be associated with a first room of the premises 100. The fourth spatially static device 122, the fifth spatially static device 124, and the sixth spatially static device 126 may be located at a second area 120 of the premises 100. The second area 120 may be associated with a second room of the premises 100. The seventh spatially static device 132, the eighth spatially static device 134, and the ninth spatially static device 136 may be located at a third area 130 of the premises 100. The third area 130 may be associated with a third room of the premises 100.

The gateway device 140 may be configured to receive signals from the devices located at the premises. The gateway device 140 may be configured to determine RSSI values associated with the signals. The gateway device 140 may be configured to send an indication of the RSSI values, such as to a computing device 160 located external to the premises 100. The gateway device 140 may be configured to send the indication of the RSSI values via a network 150. The network 150 may comprise a private network. The network 150 may comprise a public network, such as the Internet. The network 150 may use a communication protocol, such as an Internet Protocol (IP).

The gateway device 140 and/or the computing device 160 may be configured to classify the devices as spatially static devices or as non-spatially static devices. For example, the devices may be classified based on RSSIs associated with signals output by the devices over a period of time (e.g., a week, ten days, as examples), such as a training period. The gateway device 140 and/or the computing device 160 may be configured to determine a magnitude of fluctuations of the RSSI values associated with the devices. The gateway device 140 and/or the computing device 160 may be configured to classify the devices based on the determined magnitude of fluctuations of the RSSI values. The gateway device 140 and/or the computing device 160 may be configured to classify devices that output signals having RSSIs having low magnitude fluctuations as spatially static devices. The gateway device 140 and/or the computing device 160 may be configured to classify devices that output signals having RSSIs having high magnitude fluctuations as non-spatially static devices. For example, the gateway device 140 and/or the computing device 160 may classify the first spatially static device 112, the second spatially static device 114, the third spatially static device 116, the fourth spatially static device 122, the fifth spatially static device 124, the sixth spatially static device 126, the seventh spatially static device 132, the eighth spatially static device 134, and the ninth spatially static device 136 as spatially static devices based on low magnitude fluctuations of RSSIs of signals output by the spatially static devices.

The gateway device 140 and/or the computing device 160 may be configured to classify the devices as spatially static devices or non-spatially static devices based on connectivity of the devices. Connectivity of the devices may be determined based on a percent of a period of time (e.g., an hour, a day, a week, etc.) or a frequency at which the devices are connected to (e.g., in communication with) another device at the premises, such as the gateway device 140). The percent of time or frequency at which the devices are connected to another device may be determined based on reception of signals from the devices by the other device.

The gateway device 140 and/or the computing device 160 may be configured to cluster the spatially static devices. The gateway device 140 and/or the computing device 160 may be configured to cluster the spatially static devices into different groups and/or areas of activity. For example, based on one or more users being in one area of activity, RSSIs associated with spatially static devices in the area may experience a similar disturbance. The gateway device 140 and/or the computing device 160 may be configured to cluster the spatially static devices into areas based on time of disturbances and/or magnitude of disturbances experienced during a period of time (e.g., a week, ten days, as examples), such as a training period. For example, the first spatially static device 112, the second spatially static device 114, and the third spatially static device 116 may experience similar disruptions. The gateway device 140 and/or the computing device 160 may cluster the first spatially static device 112, the second spatially static device 114, and the third spatially static device 116. The fourth spatially static device 122, the fifth spatially static device 124, and the sixth spatially static device 126 may experience similar disruptions. The gateway device 140 and/or the computing device 160 may cluster the fourth spatially static device 122, the fifth spatially static device 124, and the sixth spatially static device 126. The seventh spatially static device 132, the eighth spatially static device 134, and the ninth spatially static device 136 may experience similar disruptions. The gateway device 140 and/or the computing device 160 may cluster the seventh spatially static device 132, the eighth spatially static device 134, and the ninth spatially static device 136.

The gateway device 140 and/or the computing device 160 may be configured to determine patterns of user behavior at the premises 100. The patterns of user behavior may comprise a probability that there will be user activity (e.g., user movement and/or presence) in an area 110, 120, 130 of the premises 100 as a function of time and/or day. The gateway device 140 and/or the computing device 160 may be configured to determine the probability based on determining a duration of user activity within an area 110, 120, 130 of the premises 100. The patterns of user behavior may comprise patterns of transition of user activity between areas 110, 120, 130 of the premises 100. The gateway device 140 and/or the computing device 160 may be configured to determine the patterns of user behavior by determining time, duration, and/or transition of user activity associated with areas 110, 120, 130 of the premises 100. The gateway device 140 and/or the computing device 160 may be configured to determine the time, duration, and/or transition of user activity associated with areas 110, 120, 130 of the premises 100 for a period of time (e.g., a week, ten days, etc.), such as a training period.

For example, a determined pattern of behavior may indicate that a user at the premises 100 may have a high probability (e.g., greater than or equal to 50%, 60%, 70%, 80%, 90%) of entering the first area 110 at or around 5:00 p.m. on a weekday. The determined pattern of behavior may indicate that five minutes after entering the first area 110, the user may have a high probability of transitioning to the second area 120. The determined pattern of behavior may indicate that thirty minutes after entering the second area 120, the user may have a high probability of transitioning to the third area 130.

The gateway device 140 and/or the computing device 160 may be configured to determine abnormal user activity. The gateway device 140 and/or the computing device 160 may be configured to determine abnormal user activity by determining that the probability of disruptions in RSSIs of signals from spatially static devices associated with an area 110, 120, 130 at a time of day is low (e.g., equal than or less than 50%, 40%, 30%, etc.). For example, disruptions in RSSI of signals from spatially static devices associated with an area that are improbable may be caused by the presence of an intruder. Disruptions in RSSI of signals from spatially static devices associated with an area that are improbable may be caused by absence of a user, such as due to injury, illness, or incapacitation. Based on the determining abnormal user activity, the gateway device and/or the computing device 160 may be configured to send an alert, such as to a device of another user, a healthcare provider, or an emergency responder.

Figure 2:
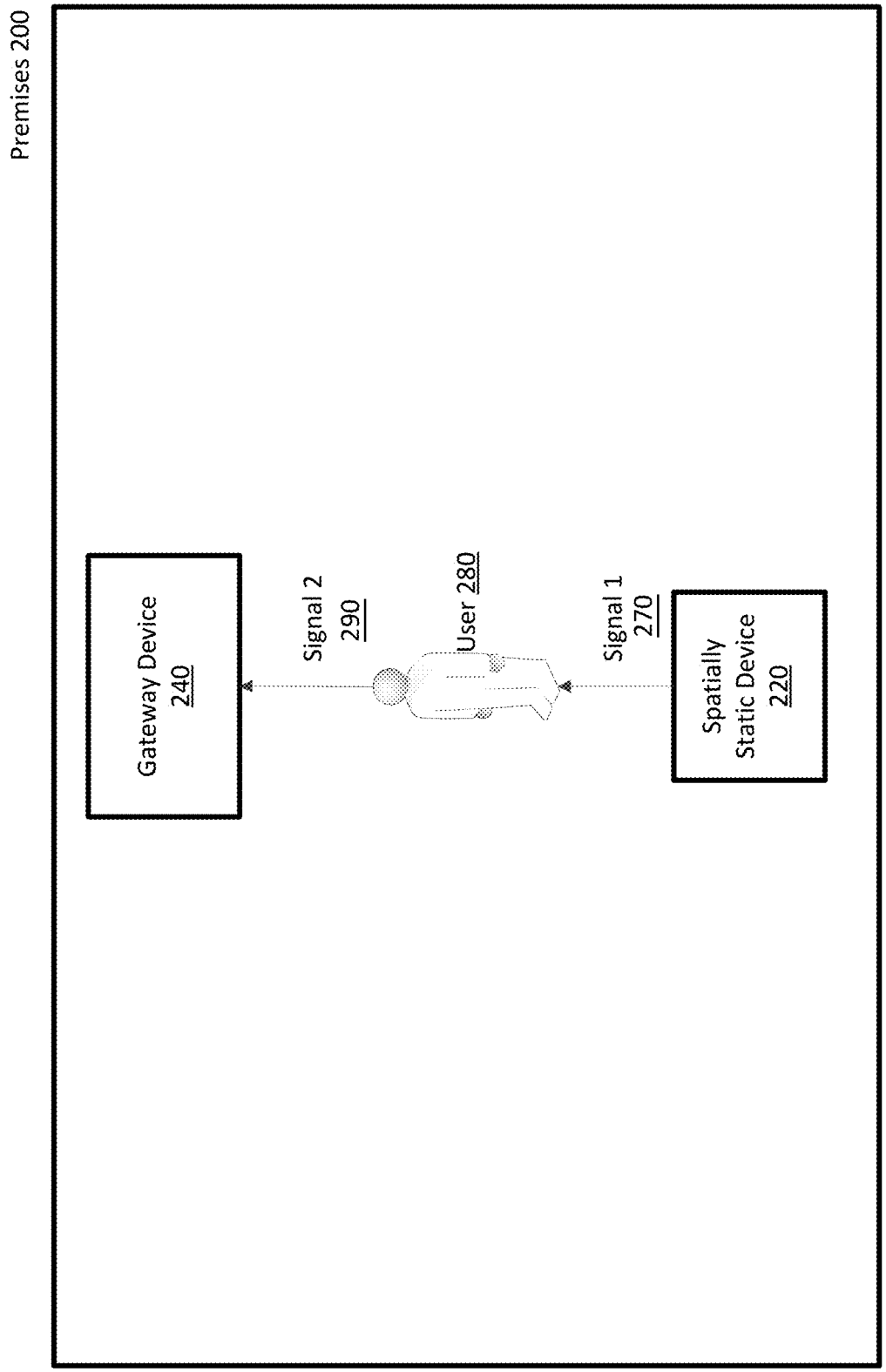
FIG. 2 shows an example operating environment.

FIG. 2 shows an example operating environment. The operating environment may comprise a premises (e.g., the premises 100 in FIG. 1). A gateway device 240 (e.g., the gateway device 140 in FIG. 1) may be located at the premises 200. One or more spatially static devices 220 (e.g., the spatially static devices 112-136 in FIG. 1) may be located at the premises 200. The spatially static devices 220 may be configured to communicate with the gateway device

240. The gateway device 240 may be configured to receive signals from the devices located at the premises. The gateway device 240 may be configured to determine RSSI values associated with the signals.

The RSSI values of signals received from the spatially static device 220 may be affected by the presence of a user 280, such as in a direction of propagation of a signal from the spatially static device 220. The body of the user 280 may cause absorption and/or interference of signals from the spatially static device 220.

For example, the spatially static device 220 may send a signal 270. The user 280 may be present (e.g., standing, moving, etc.) through a path of propagation of the signal 270. The signal 270 may enter the user's 280 body. At least a portion of the signal 270 may be absorbed by the user's 280 body.

The signal 290, the signal 270 having passed through and/or emerged from the user's body 280, may be received by the gateway device 240. The signal 290 received from the gateway device 240 may have a different RSSI than the signal 270 that the spatially static device 220 initially transmitted. For example, the RSSI of the signal 290 may be weaker than the RSSI of the signal 270.

The signal 290 may have a different RSSI than a signal received from the spatially static device 220 (e.g., by the gateway device 240) at a different time. For example, the signal 290 may have a different RSSI than signals that are received from the spatially static device 220 when a user is not in the path of propagation, in an area proximate the spatially static device, and/or at the premises 200. The difference in RSSI of signals received from the spatially static device 220 at different times may comprise a "fluctuation" in RSSI.

Figure 3:
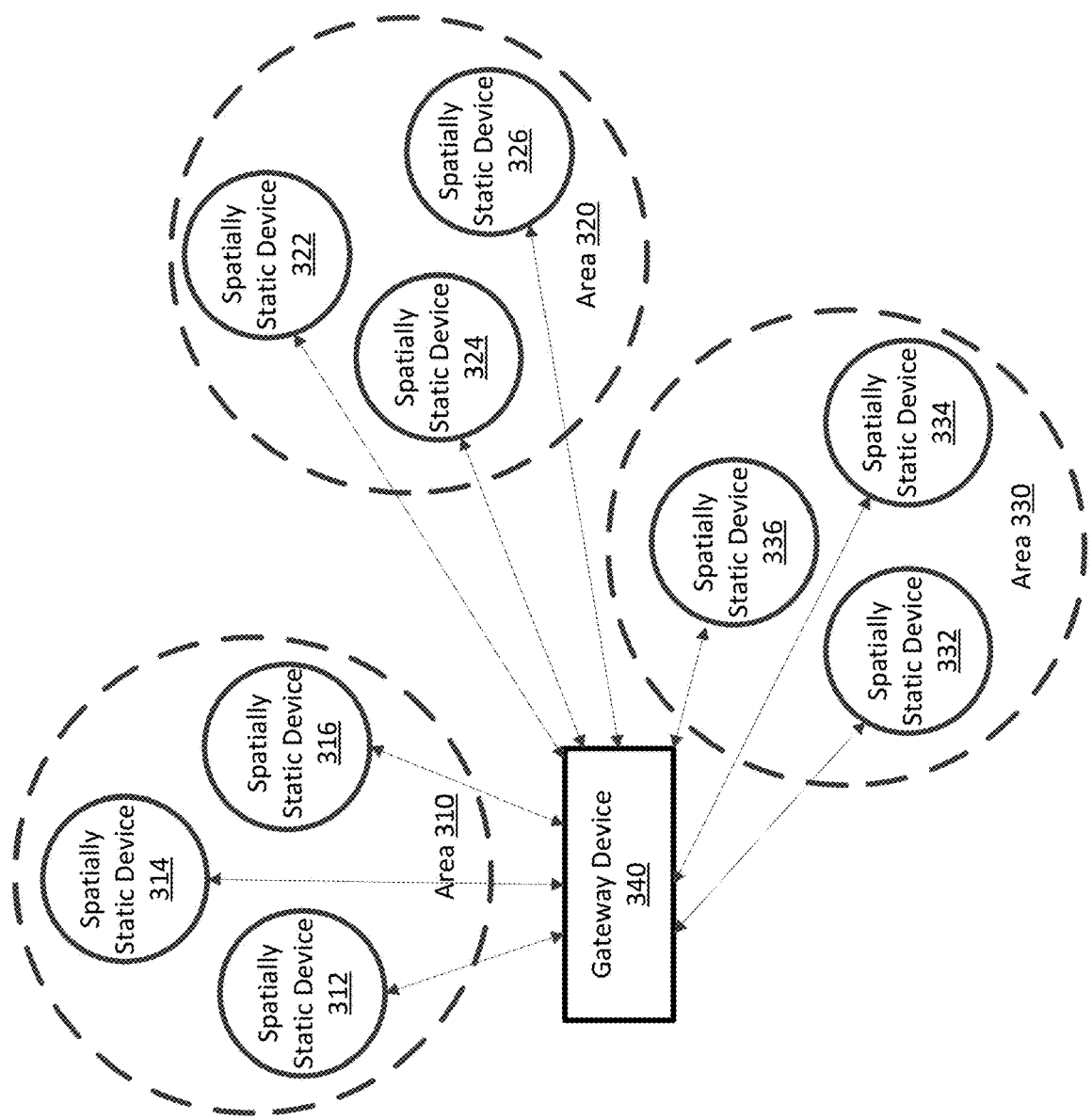
FIG. 3 shows an example method.

FIG. 3 shows example clusters of spatially static devices. The spatially static devices 312, 314, 316, 322, 324, 326, 332, 334 (e.g., spatially static devices 112, 114, 116, 122, 124, 126, 132, 134, 136 in FIG. 1) may be located at a premises (e.g., premises 100 in FIG. 1) The spatially static devices may be located in a first area 310, a second area 320, or a third area 330 of a premises (e.g., the premises 100 in FIG. 1). The spatially static devices may be in communication with a gateway device 240 (e.g., the gateway device 140 in FIG. 1). The gateway device 340 may be located at the premises. The gateway device 340 may be in communication with a computing device located external to the premises.

The gateway 340 and/or in the computing device may cluster the devices into areas and/or groups. The gateway 340 and/or in the computing device may cluster the devices into areas and/or groups based on RSSIs of signals output by the spatially static devices. The clusters of devices may comprise groups of devices that are spatially-related, such as within a particular room of area. RSSIs associated with signals output by a cluster of spatially static devices may exhibit disruptions at the same time or at similar times. Based on the RSSIs exhibiting similar disruptions, the gateway 340 and/or in the computing device may cluster the group of spatially static devices in the area.

For example, as a result of one or more users being present in the first area 310 of the premises, the first spatially static device 312, the second spatially static device 314, and the third spatially static device 316 may output signals having RSSIs with similar disruptions. The spatially static devices 322, 324, 326, 332, 334, 336 that are not in the first area 310 may output signals having RSSIs with dissimilar or no disruptions. Based on the similarity of the disruptions in the RSSIs of the signals output by the spatially static devices in the first area 310, the gateway device 340 and/or the computing device may cluster the first spatially static device 312, the second spatially static device 314, and the third spatially static device 316 into a group. The gateway device 340 and/or the computing device may determine that the group is associated with the first area 310. The gateway device 340 and/or the computing device may perform similar steps to cluster the fourth spatially static device 322, the fifth spatially static device 324, and the sixth spatially static device 326 in a group and/or determine that the group is associated with the second area 320. The gateway device 340 and/or the computing device may perform similar steps to cluster the seventh spatially static device 332, the eighth spatially static device 334, and the ninth spatially static device 336 in a group and/or determine that the group is associated with the third area 330.

Figure 4:
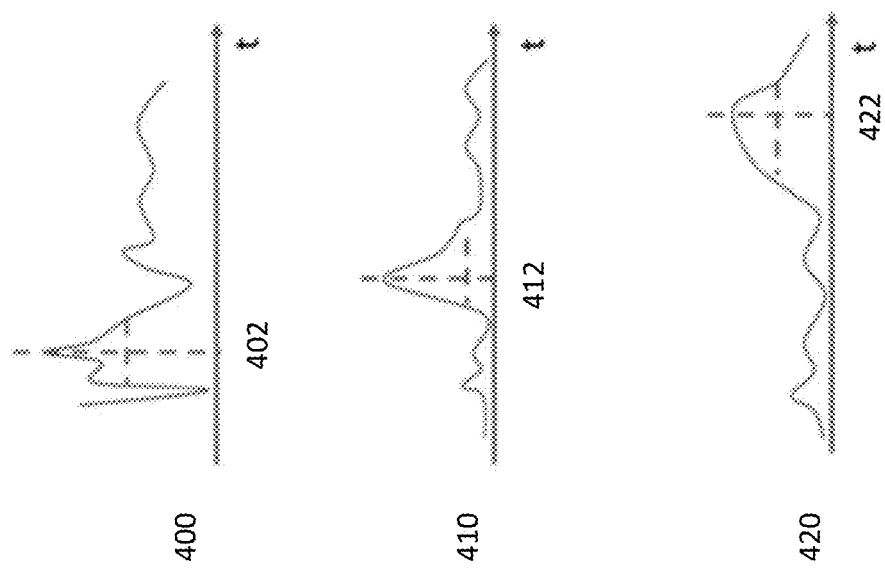
FIG. 4 shows example pattern data.

FIG. 4 shows example pattern data. Graph 400 may show a probability distribution associated with user activity. The graph 400 may be associated with the first area 310 of the premises shown in FIG. 3. A horizontal axis of the graph 400 may represent a time of day. A vertical axis (not shown) of the graph 400 may represent a probability associated with user activity in the first area 310. The graph 400 may show a probability distribution associated with user activity in the first area 310 at a particular time. A time 402 on the horizontal axis of the graph 400 may correspond to a time when user activity in the first area 310 is most likely. Data represented by the graph 400 may be generated, maintained, and/or analyzed by the gateway device 140 in FIG. 1 and/or the gateway device 340 in FIG. 3 and/or an associated computing device. The data in graph 400 may be generated, maintained and analyzed by the computing device 160 in FIG. 1 and/or an associated computing device.

Graph 410 may show a probability distribution associated with user activity. The graph 410 may be associated with the second area 320 of the premises shown in FIG. 3. A horizontal axis of the graph 410 may represent a time of day. A vertical axis (not shown) of the graph 410 may represent a probability associated with user activity in the second area 310. The graph 410 may show a probability distribution associated with user activity in the second area 320 at a particular time. A time 412 on the horizontal axis of the graph 410 may correspond to a time when user activity in the second area 320 is most likely. Data represented by the graph 410 may be generated, maintained, and/or analyzed by the gateway device 140 in FIG. 1, the gateway device gateway device 440 in FIG. 4, and/or an associated computing device. The data represented by the graph 410 may be generated, maintained, and/or analyzed by the computing device 160 in FIG. 1 and/or an associated computing device.

Graph 420 may show a probability distribution associated with user activity. The graph 420 may be associated with the third area 330 shown in FIG. 3. A horizontal axis of the graph 420 may represent a time of day. A vertical axis (not shown) of the graph 420 may represent a probability of a determined user activity in the third area 330. The graph 420 may show a probability distribution associated with user activity in the third area 330 at a particular time. A time 422 on the horizontal axis of the graph 420 may correspond to a time when user activity in the third area 330 is most likely. Data represented by the graph 420 may be generated, maintained, and/or analyzed by the gateway device 340, the computing device, and/or an associated computing device.

Figure 5:
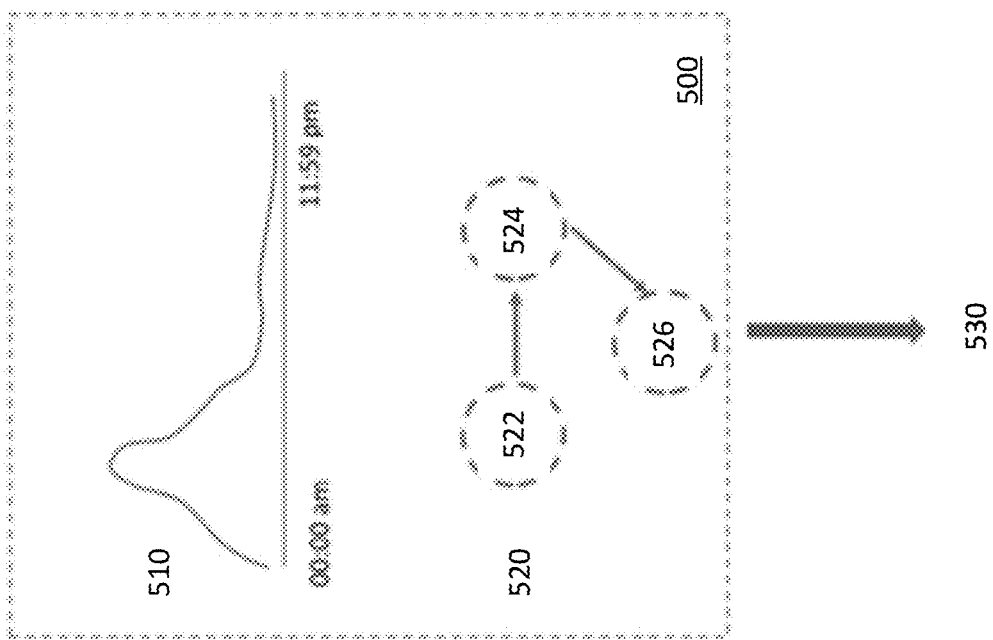
FIG. 5 shows an example pattern.

FIG. 5 shows an example user activity pattern. Data represented by the profile 500 of normal behavior may be generated, maintained, analyzed, and/or retrieved. The data represented by profile 500 may be generated, maintained, analyzed, and/or retrieved by the gateway device 140 in FIG. 1, the gateway device 240 in FIG. 2, the gateway device 340 in FIG. 3, and/or an associated computing device. The data represented by the profile 500 may be generated, maintained, analyzed, and/or retrieved by the computing device 160 in FIG. 1 and/or an associated computing device. The profile 500 may indicate a transition probability across areas of activity 520. A graph associated with the profile 500 may represent the transition probability across the areas of activity 520. FIG. 5 shows a representation of a first area 522, a second area 524, and a third area 526. The representation of the first area 522 may correspond to the first area 310 in FIG. 3. The representation of the second area 524 may correspond to the second area 320 in FIG. 3. The representation of the third area 526 may correspond to the third area 330 in FIG. 3. The transition probability may indicate a likelihood that a user would move across the areas 522, 524, 526. The transition probability may indicate an expected order of user activity associated with areas 522, 524, 526. The expected order of user activity may comprise a sequence of spaces and/or areas that a user moves through. The expected order of user activity may comprise a speed of movement of the user. The expected order of user activity may comprise a time that a user spends in a space and/or area.

The profile 500 may comprise a probability of user activity with respect to time (e.g., time of day). The profile 500 may comprise and/or be based on a determined user activity pattern and/or transition probability across the areas of activity 520. The profile 500 may comprise a probability distribution of user activity (e.g., in the areas of activity 520) over time, as represented by the graph 510. For example, the graph 510 may show that activity (e.g., in an area of activity 520-522, 524, 526) is more likely to occur in the morning than in the afternoon or the night. Based on a determination of user activity at a time that the profile 500 indicates that user activity is unlikely, abnormal user behavior may be determined. It may be determined that the profile 500 indicates that user activity (e.g., in an area of activity 520-522, 524, 526) is unlikely at the time based on the probability distribution associated with normal behavior. For example, based on determined activity and night and the normal behavior pattern indicating that the probability of activity at night is less than 5%, abnormal behavior may be determined. Based on user activity (e.g., in an area of activity 520-522, 524, 526) not being determined at a time when the profile 500 indicates that user activity is likely, abnormal user behavior may be determined. Based on user activity being different from the expected order of user activity and/or out of sequence of the transition probability across areas of activity 520 of the profile 500, abnormal user behavior may be determined.

Based on determining abnormal user behavior, a notification of abnormal user behavior may be generated. The notification may be generated by the gateway device 140 in FIG. 1 or the gateway device 340 in FIG. 3. The notification may be generated by the computing device 360 in FIG. 3. The notification may be sent to a device 530. The device 530 may be associated with an emergency dispatch, a family member of a user, an emergency contact, a hospital, and/or healthcare personnel, as examples.

Figure 6:
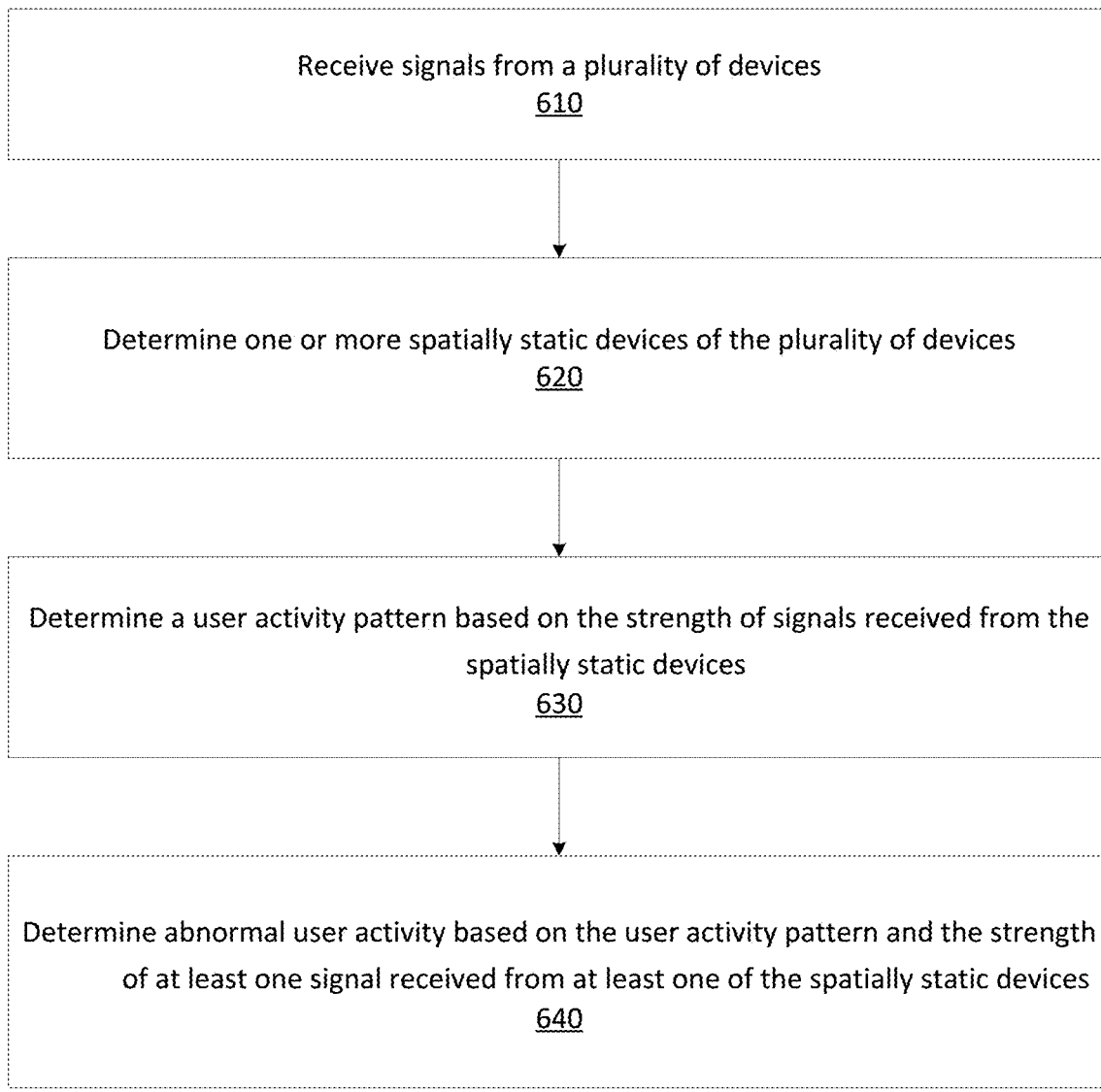
FIG. 6 shows an example method.

FIG. 6 shows an example method. At step 610, signals may be received. The signals may be received from a plurality of devices. The gateway device 140 in FIG. 1 may receive the signals from the plurality of devices. The computing device 160 in FIG. 1 may receive signals from a plurality of devices. The signals may comprise Wi-Fi signals. Receiving the signals may comprise receiving the signals within a period of time.

At step 620, one or more spatially static devices of the plurality of devices may be determined. Determining the one or more spatially static devices may comprise distinguishing spatially static devices from non-spatially static (e.g., mobile) devices of the plurality of devices. The one or more spatially static devices may be determined based on strengths of the received signals. The one or more spatially static devices may be determined based on fluctuations in strengths of the received signals. For example, spatially static devices may exhibit fewer or smaller fluctuations in signal strength than non-spatially static devices. The gateway device 140 in FIG. 1 may determine one or more spatially static devices of the plurality of devices based on strengths of the received signal. The gateway device 140 in FIG. 1 may determine one or more spatially static devices of the plurality of devices based on fluctuations in strengths of the received signals. The computing device 160 in FIG. 1 may determine one or more spatially static devices of the plurality of devices based on strengths of the received signals. The computing device 160 in FIG. 1 may determine one or more spatially static devices of the plurality of devices based on fluctuations in strengths of the received signals. The received signals may have received signal strength indicators (RSSIs).

At step 630, a user activity pattern may be determined. The user activity pattern may be determined based on changes in strengths of signals received from the spatially static devices. The activity pattern may be determined based on changes in strengths of signals received from the spatially static devices within a training time period. The gateway device 140 in FIG. 1 may determine a user activity pattern based on changes in strengths of signals received from the spatially static devices within a training time period. The computing device 160 in FIG. 1 may determine a user activity pattern based on changes in strengths of signals received from the spatially static devices within a training time period. The user activity pattern may be based on changes in the strengths of the signals caused by absorption or interference of the signals by one or more users. The user activity pattern may associate user activity at a time of day with a probability.

At step 640, abnormal user activity may be determined. The abnormal user activity may be determined based on the user activity pattern. The abnormal user activity may be determined based on a strength of at least one signal received from at least one of the spatially static devices. The abnormal user activity may be determined based on a strength of at least one signal received from at least one of the spatially static devices after the training time period. The gateway device 140 in FIG. 1 may determine abnormal user activity based on the user activity pattern and a strength of at least one signal received from at least one of the spatially static devices. The computing device 160 in FIG. 1 may determine abnormal user activity based on the user activity pattern and a strength of at least one signal received from at least one of the spatially static devices. Determining abnormal user activity may comprise determining that a change in the strength of at least one signal deviates from a portion of a signal strength pattern associated with the training time period. The abnormal user activity may be associated with at least one of abnormally low user activity or abnormally high user activity.

The determining the abnormal user activity may comprise determining the abnormal user activity in an area of a premises. Determining the abnormal user activity in the area of the premises may be based on RSSIs associated with signals received from a group of devices located in another area of the premises. The determining the abnormal user activity may comprise determining a movement of a user between the area of the premises and the other area of the premises. The determining the abnormal user activity may comprise determining that a probability of the user moving between the area of the premises and the other area of the premises may be equal to or less than a threshold probability. The area of the premises may be associated with a room of the premises. The abnormal user activity may be associated with an intruder at the premises.

An alert may be sent based on the abnormal user activity. The gateway device 140 in FIG. 1 may send an alert based on the abnormal user activity. The computing device 160 in FIG. 1 may send an alert based on the abnormal user activity.

An alarm may be triggered based on the abnormal user activity. The gateway device 140 in FIG. 1 may trigger an alarm based on the abnormal user activity. The computing 160 in FIG. 1 may trigger an alarm based on the abnormal user activity. An alarm may be caused to be triggered based on the abnormal user activity. The gateway device 140 in FIG. 1 may cause an alarm to be triggered based on the abnormal user activity. The computing 160 in FIG. 1 may cause an alarm to be triggered based on the abnormal user activity.

For example, a premises may comprise areas or rooms, such as a kitchen and a living room. A gateway device may be located at the premises. A smart refrigerator and a smart dish washer may be located in the kitchen. A smart speaker and a smart television may be located in the living room. A smart phone may be located at the premises. The refrigerator, the dish washer, the smart speaker, the smart television, and the smart phone may be in communication with the gateway device via Wi-Fi. Wi-Fi signals received by the gateway device from the devices may have associated signal strength indicators (RSSIs). The gateway device may classify the refrigerator, the dish washer, the smart speaker, and the smart television as spatially static devices based on a low variation in RSSI values of signals received by the gateway device over a training period. The gateway device may classify the smart phone as a mobile device based on a high variation in RSSIs of signals received by the gateway device.

Based on user activity occurring in the kitchen, signals having RSSI values lower than a baseline value may be received from the refrigerator. The signals may be received from a gateway device. The baseline value may be determined based on RSSI values when there is no user activity in an area, such as the kitchen. For example, it may be determined that a baseline value may comprise an RSSI of −60. As an example, the baseline value may be determined for the kitchen at midnight, when there is no user activity. Signals having RSSI values lower than a baseline value may be received from the IoT device associated with the dish washer. RSSIs of signals received from the smart speaker and the smart television may be equal to an expected baseline value. Based on the RSSIs and/or the expected baseline values, the refrigerator and the dish washer may be clustered into a first area of activity.

Based on user activity occurring in the living room, the gateway device may receive signals having RSSIs lower than an expected baseline value from the smart speaker. The gateway device may receive signals having RSSIs lower than an expected baseline value from the smart television. RSSIs of signals received from the IoT device associated with the refrigerator and the IoT device associated with the dish washer may remain equal to an expected baseline. The gateway device may cluster the smart speaker and the smart television into a second area of activity.

The gateway device may generate a profile of normal user activity based on RSSIs of signals received from the spatially static devices over a training period. After generating the profile, the gateway device may receive an indication of user activity in the second area of activity at 2 p.m. on a Monday. Based on the profile, the gateway device may determine that user activity in the second area of activity at 2 p.m. on a Monday is abnormal user activity. The gateway device may cause a notification indicative of the of abnormal user activity to be sent to a device of a user associated with the premises.

Figure 7:
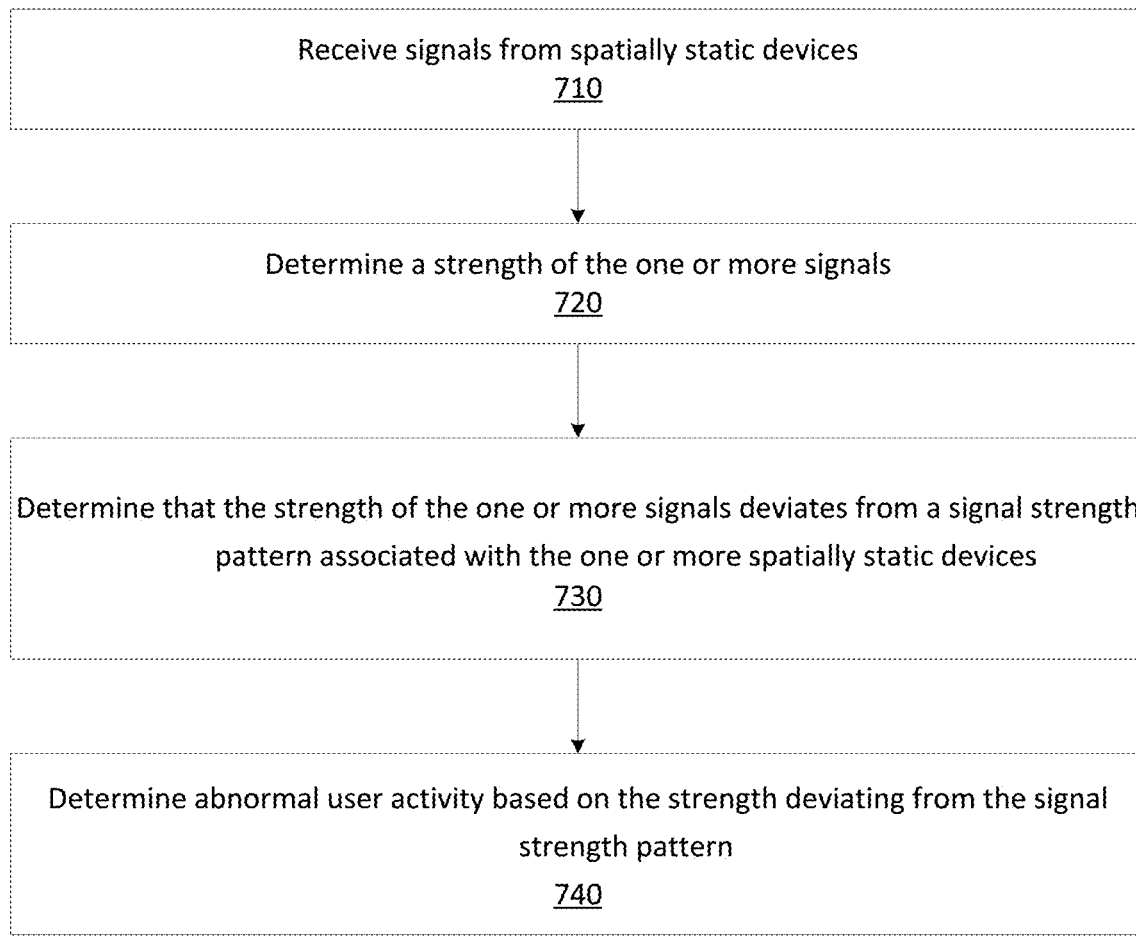
FIG. 7 shows an example method.

FIG. 7 shows an example method. At step 710, one or more signals may be received. The signals may be received from one or more spatially static devices. The gateway device 140 in FIG. 1 may receive one or more signals from one or more spatially static devices. The computing device 160 in FIG. 1 may receive one or more signals from one or more spatially static devices. The receiving of the one or more signals may comprise receiving the one or more signals within a period of time. The one or more signals may comprise Wi-Fi signals.

At step 720, a strength of the one or more signals may be determined. The gateway device 140 in FIG. 1 may determine a strength of the one or more signals. The computing device 160 in FIG. 1 may determine a strength of the one or more signals. The strengths of the one or more signals may comprise received signal strength indicators (RSSIs).

At step 730, a determination may be made that the strength of the one or more signals deviates from a signal strength pattern. It may be determined that the strength deviates by at least a threshold value. It may be determined that the signal strength deviates from a signal strength pattern associated with the one or more spatially static devices, such as by the threshold value. The gateway device 140 in FIG. 1 may determine that the strength of the one or more signals deviates, by at least a threshold value, from a signal strength pattern associated with the one or more spatially static devices. The computing device 160 in FIG. 1 may determine that the strength of the one or more signals deviates, by at least a threshold value, from a signal strength pattern associated with the one or more spatially static devices.

The determining that the strength of the one or more signals deviates from the signal strength pattern by at least the threshold value may comprise determining that a change in the strength of the one or more signals over the period of time may deviate from a portion of the signal strength pattern associated with the period of time. The signal strength pattern may be based on changes in the strengths of the one or more signals caused by absorption or interference of the signals by one or more users. The signal strength pattern may associate a time of day with a probability. The probability may represent a probability of experiencing a disruption from an associated RSSI.

At step 740, abnormal user activity may be determined. The abnormal user activity may be determined based on the strength deviating from the signal strength pattern by at least the threshold value. The gateway device 140 in FIG. 1 may determine abnormal user activity based on the strength deviating from the signal strength pattern by at least the threshold value. The computing device 160 in FIG. 1 may determine abnormal user activity based on the strength deviating from the signal strength pattern by at least the threshold value. The abnormal user activity may be associated with at least one of abnormally low user activity or abnormally high user activity.

The determining the abnormal user activity may comprise determining the abnormal user activity in an area of a premises. Determining the abnormal user activity in the area of the premises may be based on RSSIs associated with signals received from a group of devices. The group of devices may be located in another area of the premises. The determining the abnormal user activity may comprise determining a movement of a user between the area of the premises and the other area of the premises. The determining the abnormal user activity may comprise determining that a probability of the user moving between the area of the premises and the other area of the premises may be equal to or less than a threshold probability. The area of the premises may be associated with a room of the premises. The abnormal user activity may be caused by an intruder at the premises.

The method may comprise sending an alert. The alert may be sent based on the abnormal user activity. The gateway device 140 in FIG. 1 may send an alert based on the abnormal user activity. The computing device 160 in FIG. 1 may send an alert based on the abnormal user activity. The method may comprise causing an alert to be sent based on the abnormal user activity. The gateway device 140 in FIG. 1 may cause an alert to be sent based on the abnormal user activity. The computing 160 in FIG. 1 may cause an alert to be sent based on the abnormal user activity.

The method may comprise triggering an alarm. The alarm may be triggered based on the abnormal user activity. The gateway device 140 in FIG. 1 may trigger an alarm based on the abnormal user activity. The computing device 160 in FIG. 1 may trigger an alarm based on the abnormal user activity. The method may comprise causing an alarm to be triggered based on the abnormal user activity. The gateway device 140 in FIG. 1 may cause an alarm to be triggered based on the abnormal user activity. The computing device 160 in FIG. 1 may cause an alarm to be triggered based on the abnormal user activity.

A premises may comprise rooms and/or areas, such as a kitchen and a living room. The premises may comprise a gateway device. The kitchen may comprise an Internet of Things (IoT) device associated with a refrigerator and an IoT device associated with a dish washer. The living room may comprise a smart speaker and a smart television. A user associated with the premises may comprise a smart phone.

The IoT device associated with the refrigerator, the IoT device associated with the dish washer, the smart speaker, the smart television, and the smart phone may be in communication with the gateway device via Wi-Fi. The signals received by the gateway device from the devices at the premises may have received signal strength indicators (RSSIs). The gateway device may classify the IoT device associated with the refrigerator, the IoT device associated with the dish washer, the smart speaker, and the smart television as spatially static devices based on a high percentage of connection with the gateway device and/or a low variation in RSSI values of signals received by the gateway device over a training period. The gateway device may classify the smart phone as a mobile device based on a failure to maintain a high percentage of connection with the gateway device and/or a high variation in RSSIs of signals received by the gateway device.

Based on user activity occurring in the kitchen, the gateway device may receive signals having RSSI values lower than an expected baseline value from the IoT device associated with the refrigerator. The gateway device may receive signals having RSSI values lower than an expected baseline value from the IoT device associated with the dish washer. The gateway device may receive signals having RSSI values from the smart speaker and the smart television equal to an expected baseline value.

Based on user activity occurring in the living room, the gateway device may receive RSSIs lower than expected baseline value from the smart speaker and the smart television. The gateway device may receive signals from the IoT device associated with the refrigerator and the IoT device associated with the dish washer having RSSIs equal to an expected baseline. The gateway device may cluster the IoT device associated with the refrigerator and the IoT device associated with the dish washer into a first area of activity. The gateway device may cluster the smart speaker and the smart television into a second area of activity.

The gateway device may generate a profile of normal user activity. The gateway device may receive an indication of user activity in the second area of activity with no preceding user activity in the first area of activity. The profile may indicate that user activity in the second area of activity with no preceding user activity in the first area of activity comprises abnormal user activity. The gateway device may cause a notification of a possible intruder to be sent to an emergency dispatch system.

FIG. 8 shows an example method. At step 810, a group of devices of a plurality of spatially static devices may be determined. The group of devices may be located in an area of a premises. The group of devices may be determined based on one or more received signal strength indicators (RSSI) associated with signals received from the plurality of spatially static devices. The gateway device 140 in FIG. 1 may determine a group of devices of a plurality of spatially static devices that are located in an area of a premises based on one or more received signal strength indicators (RSSI) associated with signals received from the plurality of spatially static devices located at the premises. The computing device 160 in FIG. 1 may determine a group of devices of a plurality of spatially static devices that are located in an area of a premises based on one or more received signal strength indicators (RSSI) associated with signals received from the plurality of spatially static devices located at the premises. The area of the premises may be associated with a room of the premises. The one or more RSSI may be associated with one or more Wi-Fi signals.

At step 820, a pattern associated with user activity in the area of the premises may be determined. The pattern may be determined based on changes in one or more RSSI associated with signals received from the group of devices. The pattern may be determined based on changes in one or more RSSI associated with signals received from the group of devices within a first time period. The gateway device 140 in FIG. 1 may determine a pattern associated with user activity in the area of the premises based on changes in one or more RSSI associated with signals received from the group of devices within a first time period. The computing device 160 in FIG. 1 may determine a pattern associated with user activity in the area of the premises based on changes in one or more RSSI associated with signals received from the group of devices within a first time period. The first time period may comprise a period from a first time of day to a second time of day. The pattern may comprise a probability of an RSSI of a signal from at least one device of the group of devices at a time of day between the period from the first time of day to the second time of day. The pattern may be based on changes in the one or more RSSIs caused by absorption or interference of the signals by one or more users.

At step 830, abnormal user activity in the area of the premises may be determined. The abnormal user activity may be determined based on the pattern. The abnormal user activity may be determined based on one or more RSSI associated with signals received from the group of devices within a second time period. The gateway device 140 in FIG. 1 may determine abnormal user activity in the area of the premises based on the pattern and one or more RSSIs associated with signals received from the group of devices within a second time period. The computing device 160 in FIG. 1 may determine abnormal user activity in the area of the premises based on the pattern and one or more RSSIs associated with signals received from the group of devices within a second time period. The first time period and the second time period may be associated with a time of day.

The determining the abnormal user activity in the area of the premises may be based on RSSI associated with signals received from another group of devices. The other group of devices may be located in another area of the premises. The determining the abnormal user activity may comprise determining a movement of a user between the area of the premises and the other area of the premises. The determining the abnormal user activity may comprise determining that a probability of the user moving between the area of the premises and the other area of the premises may be equal to or less than a threshold probability. The abnormal user activity may be associated with an intruder at the premises. The abnormal user activity may be associated with at least one of abnormally low user activity or abnormally high user activity.

The method may comprise sending an alert. The alert may be sent based on the abnormal user activity. The gateway device 140 in FIG. 1 may send an alert based on the abnormal user activity. The computing device 160 in FIG. 1 may send an alert based on the abnormal user activity. The method may comprise causing an alert to be sent based on the abnormal user activity. The gateway device 140 in FIG. 1 may cause an alert to be sent based on the abnormal user activity. The computing device 160 in FIG. 1 may cause an alert to be sent based on the abnormal user activity. The method may comprise triggering an alarm based on the abnormal user activity. The gateway device 140 in FIG. 1 may trigger an alarm based on the abnormal user activity. The computing device 160 in FIG. 1 may trigger an alarm based on the abnormal user activity. The method may comprise causing an alarm to be triggered based on the abnormal user activity. The gateway device 140 in FIG. 1 may cause an alarm to be triggered based on the abnormal user activity. The computing device 160 in FIG. 1 may cause an alarm to be triggered based on the abnormal user activity.

A premises may comprise rooms and/or areas, such as a kitchen and a living room. The premises may comprise a gateway device. The kitchen may comprise an Internet of Things (IoT) device associated with a refrigerator and an IoT device associated with a dish washer. The living room may comprise a smart speaker and a smart television. A user associated with the premises may comprise a smart phone. The IoT device associated with the refrigerator, the IoT device associated with the dish washer, the smart speaker, the smart television, and the smart phone may be in communication with the gateway device via Wi-Fi signals. The Wi-Fi signals may have received signal strength indicators (RSSI). The gateway device may classify the IoT device associated with the refrigerator, the IoT device associated with the dish washer, the smart speaker, and the smart television as spatially static devices based on a high percentage of connection with the gateway device and/or a low variation in RSSIs of signals received by the gateway device over a training period. The gateway device may classify the smart phone as a mobile device based on a failure to maintain a high percentage of connection with the gateway device and/or a high variation in RSSIs of signals received by the gateway device.

Based on user activity occurring in the kitchen, the gateway device may receive signals having RSSIs lower than an expected baseline value from the IoT device associated with the refrigerator. The gateway device may receive signals having RSSIs lower than an expected baseline value from the IoT device associated with the dish washer. The gateway device may receive signals having RSSIs from the smart speaker and the smart television equal to an expected baseline.

Based on user activity occurring in the living room, the gateway device may receive signals having RSSIs lower than an expected baseline value from the smart speaker. The gateway device may receive signals having RSSIs lower than an expected baseline value from the smart television. The gateway device may receive signals from the IoT device associated with the refrigerator and the IoT device associated with the dish washer having RSSIs equal to an expected baseline. The gateway device may cluster the IoT device associated with the refrigerator and the IoT device associated with the dish washer into a first area of activity. The gateway device may cluster the smart speaker and the smart television into a second area of activity.

The gateway device may generate a profile of normal user activity. The profile may indicate that user activity in the first area is probably at 2:00 p.m. on a Saturday. The gateway device may not receive an indication of user activity in the first area at 2:00 p.m. on a Saturday. The gateway device may cause a notification indicative of abnormal user activity to be sent to a device of a family member of a user associated with the premises.

Figure 9:
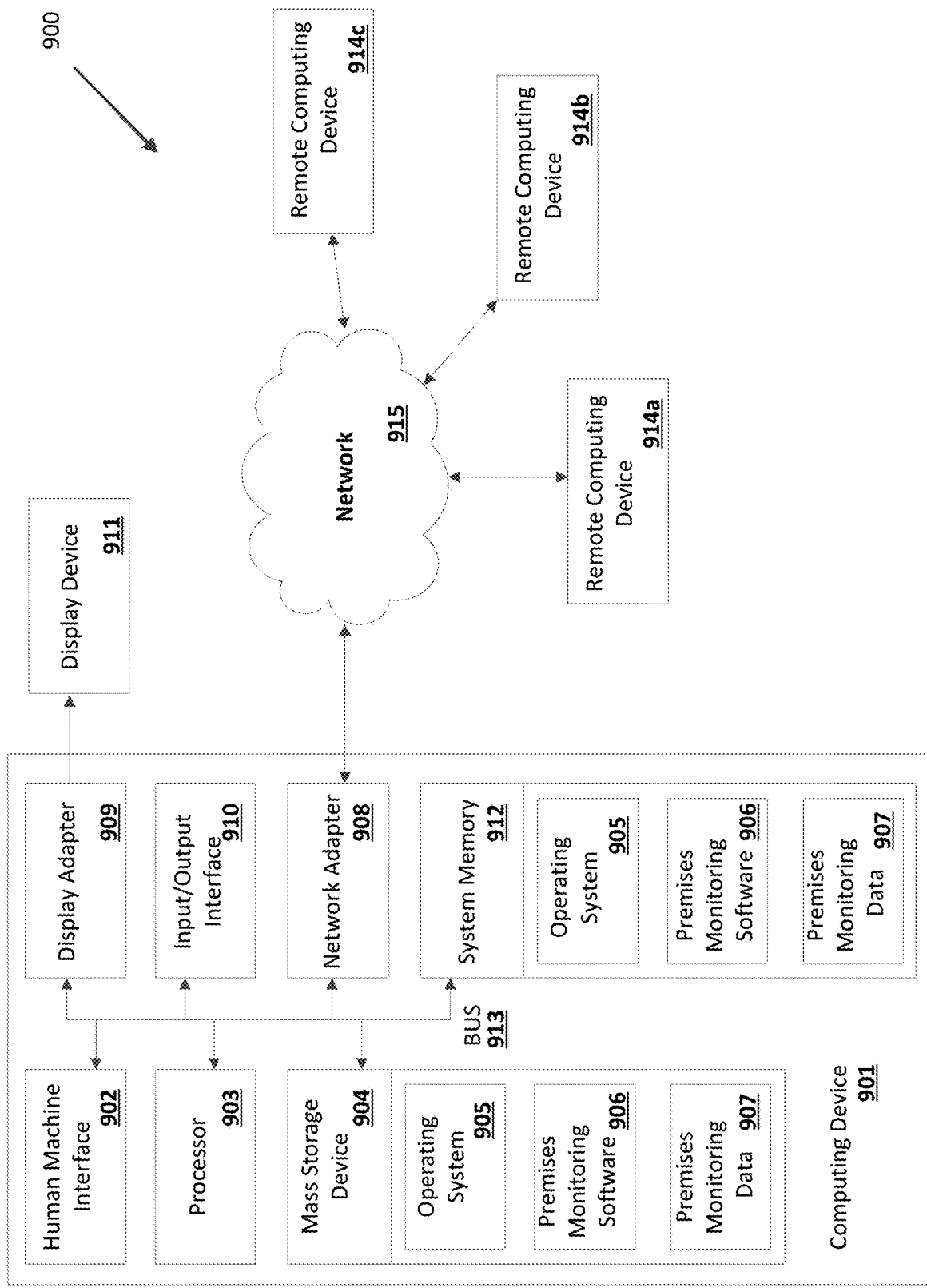
FIG. 9 shows an example computing device.

FIG. 9 shows an example operating environment 900. The computing environment 900 is only an example of an operating environment and is not intended to suggest any limitation as to the scope of use or functionality of operating environment architecture. Neither should the operating environment be interpreted as having any dependency or requirement relating to any one or combination of components shown in the example operating environment.

The present methods and systems may be operational with numerous other general purpose or special purpose computing system environments or configurations. Examples of well-known computing systems, environments, and/or configurations that may be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems may be performed by software components. The disclosed systems and methods may be described in the general context of computer-executable instructions, such as program modules, being executed by one or more computers or other devices. Generally, program modules comprise computer code, routines, programs, objects, components, data structures, that performs particular tasks or implement particular abstract data types. The disclosed methods may also be practiced in grid-based and distributed computing environments where tasks are performed by remote processing devices that are linked through a communications network. In a distributed computing environment, program modules may be located in both local and remote computer storage media including memory storage devices.

The spatially static devices 112, 114, 116, 122, 124, 126, 132, 134, 136, gateway device 140, and computing device 160 in FIG. 1 may be implemented in an instance of a computing device 900 in FIG. 9. The systems and methods disclosed herein may be implemented via a general-purpose computing device in the form of a computing device 901. The components of the computing device 901 may comprise, but are not limited to, one or more processors or processing units 903, a system memory 912, and a system bus 913 that couples various system components including the processor 903 to the system memory 912. In the case of multiple processing units 903, the system may utilize parallel computing.

The system bus 913 represents one or more of several possible types of bus structures, including a memory bus or memory controller, a peripheral bus, an accelerated graphics port, and a processor or local bus using any of a variety of bus architectures. By way of example, such architectures may comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 913, and all buses specified in this description may also be implemented over a wired or wireless network connection and each of the subsystems, including the processor 903, a mass storage device 904, an operating system 905, premises monitoring software 906, premises monitoring data 907, a network adapter 908, system memory 912, an Input/Output Interface 910, a display adapter 909, a display device 911, and a human machine interface 902, may be contained within one or more remote computing devices 914*a,b,c* at physically separate locations, connected through buses of this form, in effect implementing a fully distributed system.

The computing device 901 typically comprises a variety of computer readable media. Example readable media may be any available media that is accessible by the computing device 901 and comprises, for example and not meant to be limiting, both volatile and non-volatile media, removable and non-removable media. The system memory 912 comprises computer readable media in the form of volatile memory, such as random access memory (RAM), and/or non-volatile memory, such as read only memory (ROM). The system memory 912 typically contains data such as premises monitoring data 907 and/or program modules such as operating system 905 and premises monitoring software 906 that are immediately accessible to and/or are presently operated on by the processing unit 903.

The computing device 901 may comprise other removable/non-removable, volatile/non-volatile computer storage media. By way of example, FIG. 9 shows a mass storage device 904 which may provide non-volatile storage of computer code, computer readable instructions, data structures, program modules, and other data for the computing device 901. For example and not meant to be limiting, a mass storage device 904 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules may be stored on the mass storage device 904, including by way of example, an operating system 905 and premises monitoring software 906. Each of the operating system 905 and premises monitoring software 906 (or some combination thereof) may comprise elements of the programming and the premises monitoring software 906. Premises monitoring data 907 may also be stored on the mass storage device 904. Premises monitoring data 907 may be stored in any of one or more databases known in the art. Examples of such databases comprise, DB2®, Microsoft® Access, Microsoft® SQL Server, Oracle®, mySQL, PostgreSQL, and the like. The databases may be centralized or distributed across multiple systems.

The user may enter commands and information into the computing device 901 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices may be connected to the processing unit 803 via a human machine interface 902 that is coupled to the system bus 913, but may be connected by other interface and bus structures, such as a parallel port, game port, an IEEE 1394 Port (also known as a Firewire port), a serial port, or a universal serial bus (USB).

A display device 911 may also be connected to the system bus 913 via an interface, such as a display adapter 909. It is contemplated that the computing device 901 may have more than one display adapter 909 and the computing device 901 may have more than one display device 911. For example, a display device may comprise a monitor, an LCD (Liquid Crystal Display), or a projector. In addition to the display device 911, other output peripheral devices may comprise components such as speakers (not shown) and a printer (not shown) which may be connected to the computing device 901 via Input/Output Interface 910. Any step and/or result of the methods may be output in any form to an output device. Such output may comprise any form of visual representation, including, but not limited to, textual, graphical, animation, audio, tactile, and the like. The display 911 and computing device 901 may be part of one device, or separate devices.

The computing device 901 may operate in a networked environment using logical connections to one or more remote computing devices 914*a,b,c*. By way of example, a remote computing device may comprise a personal computer, portable computer, a smart phone, a server, a router, a network computer, a peer device or other common network node, and so on. Logical connections between the computing device 901 and a remote computing device 914*a,b,c* may be made via a network 915, such as a local area network (LAN) and a general wide area network (WAN). Such network connections may be through a network adapter 908. A network adapter 908 may be implemented in both wired and wireless environments. Such networking environments are conventional and commonplace in dwellings, offices, enterprise-wide computer networks, intranets, and the Internet.

Application programs and other executable program components such as the operating system 905 are shown herein as discrete blocks, although it is recognized that such programs and components reside at various times in different storage components of the computing device 901, and are executed by the data processor(s) of the computer. An implementation of premises monitoring software 906 may be stored on or sent across some form of computer readable media. Any of the disclosed methods may be performed by computer readable instructions embodied on computer readable media. Computer readable media may comprise any available media that may be accessed by a computer. By way of example and not meant to be limiting, computer readable media may comprise "computer storage media" and "communications media." "Computer storage media" comprise volatile and non-volatile, removable and non-removable media implemented in any methods or technology for storage of information such as computer readable instructions, data structures, program modules, or other data. Example computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

The invention claimed is:

1. A method comprising:
   determining first strengths of a plurality of wireless communication signals received from a plurality of spatially static devices located at a premises;
   determining, based at least in part on the first strengths of the plurality of wireless communication signals, a group of devices of the plurality of spatially static devices that are located in an area of the premises;
   determining, based on one or more changes, during a first time period, of second strengths of wireless communication signals associated with the group of devices, a pattern associated with user activity in the area of the premises; and
   determining, based on the pattern and based on third strengths of wireless communication signals associated with the group of devices within a second time period, abnormal user activity in the area of the premises.

2. The method of claim 1, wherein the first time period comprises a period from a first time of day to a second time of day, and wherein the pattern comprises a probability of a strength of a wireless communication signal changing by a threshold amount at a time between the first time of day and the second time of day.

3. The method of claim 1, wherein the area of the premises is associated with a room of the premises.

4. The method of claim 1, wherein the abnormal user activity is associated with an intruder at the premises.

5. The method of claim 1, wherein at least one of the first strengths, the second strengths, or the third strengths is based, at least in part, on one or more received signal strength indicators (RSSI) associated with one or more of the plurality of wireless communication signals.

6. The method of claim 1, wherein the changes of the second strengths of the wireless communication signals is caused by at least one of absorption or interference of the wireless communication signals by one or more users.

7. The method of claim 1, further comprising at least one of sending an alert or triggering an alarm based on the abnormal user activity in the area of the premises.

8. The method of claim 1, wherein the one or more spatially static devices comprise one or more of a wearable device, a camera, a lighting device, a thermostat, a motion sensor, a gateway device, or a virtual assistant.

9. A method comprising:
   receiving, from a plurality of devices at a premises, first wireless communication signals;
   determining, based on first strengths associated with the first wireless communication signals, a first group of spatially static devices of the plurality of devices associated with a first area of the premises;
   determining, based on the first strengths, a second group of spatially static devices of the plurality of devices associated with a second area of the premises;
   determining, based on changes in second strengths of second wireless communication signals received from the first group of spatially static devices and the second group of spatially static devices within a first time period, a user activity pattern; and
   determining, based on the user activity pattern and third strengths of third wireless communication signals received from at least one of the first group of spatially static devices or from at least one of the second group of spatially static devices during a second time period, abnormal user activity.

10. The method of claim 9, wherein a first type of activity is associated with the first group of spatially static devices and wherein a second type of activity is associated with the second group of spatially static devices.

11. The method of claim 10, wherein the user activity pattern is based, at least in part, on the first type of activity and the second type of activity.

12. The method of claim 9, wherein determining the abnormal user activity further comprises, based on the third strengths of the third wireless communication signals, determining a movement of a user between the first area of the premises and the second area of the premises.

13. The method of claim 12, wherein determining the abnormal user activity further comprises determining, based on the user activity pattern, that a probability of a user moving between the first area of the premises and the second area of the premises is less than a threshold probability.

14. The method of claim 9, further comprising at least one of sending an alert or triggering an alarm based on the abnormal user activity.

15. A system comprising: a plurality of spatially static devices located at a premises; and a computing device configured to: determine first strengths of a plurality of wireless communication signals received from the plurality of spatially static devices; determine, based at least in part on the first strengths of the plurality of wireless communication signals, a group of devices of the plurality of spatially static devices that are located in an area of the premises; determine, based on one or more changes, during a first time period, of second strengths of wireless communication signals associated with the group of devices, a pattern associated with user activity in the area of the premises; and determine, based on the pattern and based on third strengths of wireless communication signals associated with the group of devices received within a second time period, abnormal user activity in the area of the premises.

16. The system of claim 15, wherein the first time period comprises a period from a first time of day to a second time of day, and wherein the pattern comprises a probability of a strength of a wireless communication signal changing by a threshold amount at a time between the first time of day and the second time of day.

17. The system of claim 15, wherein at least one of the first strength, the second strength, or the third strength is based, at least in part, on one or more received signal strength indicators (RSSI) associated with one or more of the plurality of wireless communication signals.

18. The system of claim 15, wherein the changes of the second strengths of the wireless communication signals is caused by at least one of absorption or interference of the wireless communication signals by one or more users.

19. The system of claim 15, wherein the computing device is further configured to at least one of:
   send, based on the abnormal user activity; an alert; and
   trigger, based on the abnormal user activity, an alarm.

20. The system of claim 15, wherein the one or more spatially static devices comprise one or more of a wearable device, a camera, a lighting device, a thermostat, a motion sensor, a gateway device, or a virtual assistant.

* * * * *